(12) United States Patent
Kato

(10) Patent No.: US 9,585,234 B2
(45) Date of Patent: Feb. 28, 2017

(54) LIGHTING DEVICE AND ILLUMINATING DEVICE

(71) Applicant: Panasonic Intellectual Property Management Co., Ltd., Osaka (JP)

(72) Inventor: Kazuya Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/014,216

(22) Filed: Feb. 3, 2016

(65) Prior Publication Data

US 2016/0262247 A1   Sep. 8, 2016

(30) Foreign Application Priority Data

Mar. 2, 2015   (JP) ................. 2015-040713

(51) Int. Cl.
| | |
|---|---|
| *H05B 41/16* | (2006.01) |
| *H05B 41/292* | (2006.01) |
| *H01J 61/54* | (2006.01) |
| *H05B 41/288* | (2006.01) |

(52) U.S. Cl.
CPC .......... *H05B 41/2926* (2013.01); *H01J 61/54* (2013.01); *H05B 41/2887* (2013.01)

(58) Field of Classification Search
CPC .... H05B 33/08; H05B 41/2325; H05B 41/18; H05B 41/042; H01F 38/10; Y02B 20/204
USPC . 315/DIG. 1, 2, 4, 5, 7, 291, 307, 308, 224, 315/246
See application file for complete search history.

(56) References Cited

U.S. PATENT DOCUMENTS

| | | | |
|---|---|---|---|
| 5,706,185 A | 1/1998 | Toyama et al. | |
| 2003/0080693 A1* | 5/2003 | Ono .................... | H05B 41/2925 315/224 |
| 2008/0116820 A1* | 5/2008 | Ozasa ................ | H05B 41/2928 315/246 |
| 2010/0109542 A1 | 5/2010 | Komatsu et al. | |
| 2010/0156312 A1* | 6/2010 | Yufuku .............. | H05B 41/2881 315/287 |
| 2011/0121746 A1* | 5/2011 | Yamamoto ......... | H05B 41/2882 315/287 |
| 2013/0334962 A1 | 12/2013 | Nishikawa | |

FOREIGN PATENT DOCUMENTS

| | | |
|---|---|---|
| JP | 09-50893 A | 2/1997 |
| JP | 2000-082592 A | 3/2000 |

(Continued)

*Primary Examiner* — Minh D A
(74) *Attorney, Agent, or Firm* — Renner, Otto, Boisselle & Sklar, LLP

(57) ABSTRACT

The lighting device of one aspect according to the present disclosure calculates, based on a voltage value of an AC voltage applied to a discharge lamp and a current value of AC current flowing through the discharge lamp, a first power value defined as a value of power supplied to the discharge lamp in a first half period of the AC voltage and a second power value defined as a value of power supplied to the discharge lamp in a second half period of the AC voltage. The lighting device determines that a ground fault has occurred, when an imbalance state in which a difference between the first power value and the second power value is equal to or greater than a threshold value continues for a predetermined time period.

13 Claims, 8 Drawing Sheets

(56) References Cited

FOREIGN PATENT DOCUMENTS

| JP | 2010-108657 A | 5/2010 |
| JP | 2010-277965 A | 12/2010 |
| JP | 2013-251187 A | 12/2013 |

* cited by examiner

LIGHTING DEVICE AND ILLUMINATING DEVICE

CROSS-REFERENCE TO RELATED APPLICATION

The application is based upon and claims the benefit of priority of Japanese Patent Application No. 2015-040713, filed on Mar. 2, 2015, the entire contents of which are incorporated herein by reference.

TECHNICAL FIELD

The present disclosure relates to lighting devices and illuminating devices.

BACKGROUND ART

In the past, there have been known discharge lamp lighting devices for lighting discharge lamps (see Document 1 [JP 2013-251187 A]).

The discharge lamp lighting devices disclosed in Document 1 determine that an electrical fault has occurred, when a state in which a difference between a measured voltage value of one polarity and a measured voltage value of the other polarity is equal to or greater than a threshold value continues for a predetermined time period. Accordingly, even if a ground fault (earth fault) occurs with a high ground fault resistance, the discharge lamp lighting devices can detect such a ground fault.

It is demanded that lighting devices such as the discharge lamp lighting devices disclosed in Document 1 detect a ground fault more successfully.

SUMMARY

The present disclosure is directed to lighting devices and illuminating devices which are capable of detecting a ground fault more successfully.

A lighting device of one aspect according to the present disclosure includes: a lighting circuit configured to apply an AC voltage to a discharge lamp; a voltage detector configured to measure a voltage value of the AC voltage; a current detector configured to measure a current value of AC current flowing through the discharge lamp; and a controller configured to control the lighting circuit. The controller is configured to calculate a first power value defined as a value of power supplied to the discharge lamp in a first half period of the AC voltage and a second power value defined as a value of power supplied to the discharge lamp in a second half period of the AC voltage, based on the voltage value measured by the voltage detector and the current value measured by the current detector. The controller is configured to, when an imbalance state in which a difference between the first power value and the second power value is equal to or greater than a threshold value continues for a predetermined time period, determine that a ground fault has occurred.

An illuminating device of another aspect according to the present disclosure includes: a discharge lamp; and the aforementioned lighting device for lighting the discharge lamp.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Embodiments according to the present disclosure relates to lighting devices and illuminating devices and in particular to a lighting device for lighting or operating a discharge lamp and an illuminating device including the lighting device.

1. Embodiment 1

1.1 Structure

Figure 1:
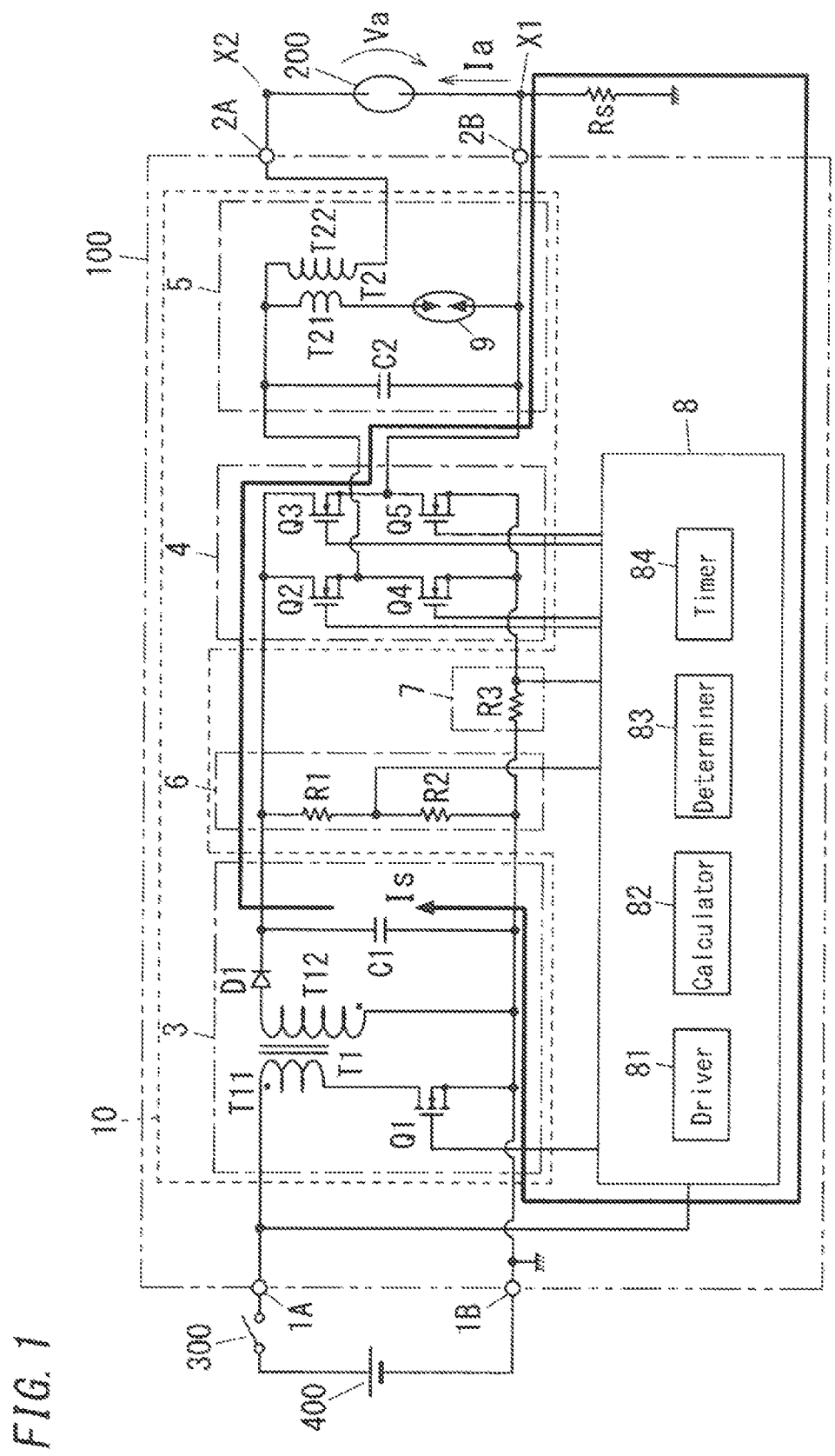
FIG. 1 is a circuit diagram of a lighting device of Embodiment 1.
Figure 2:
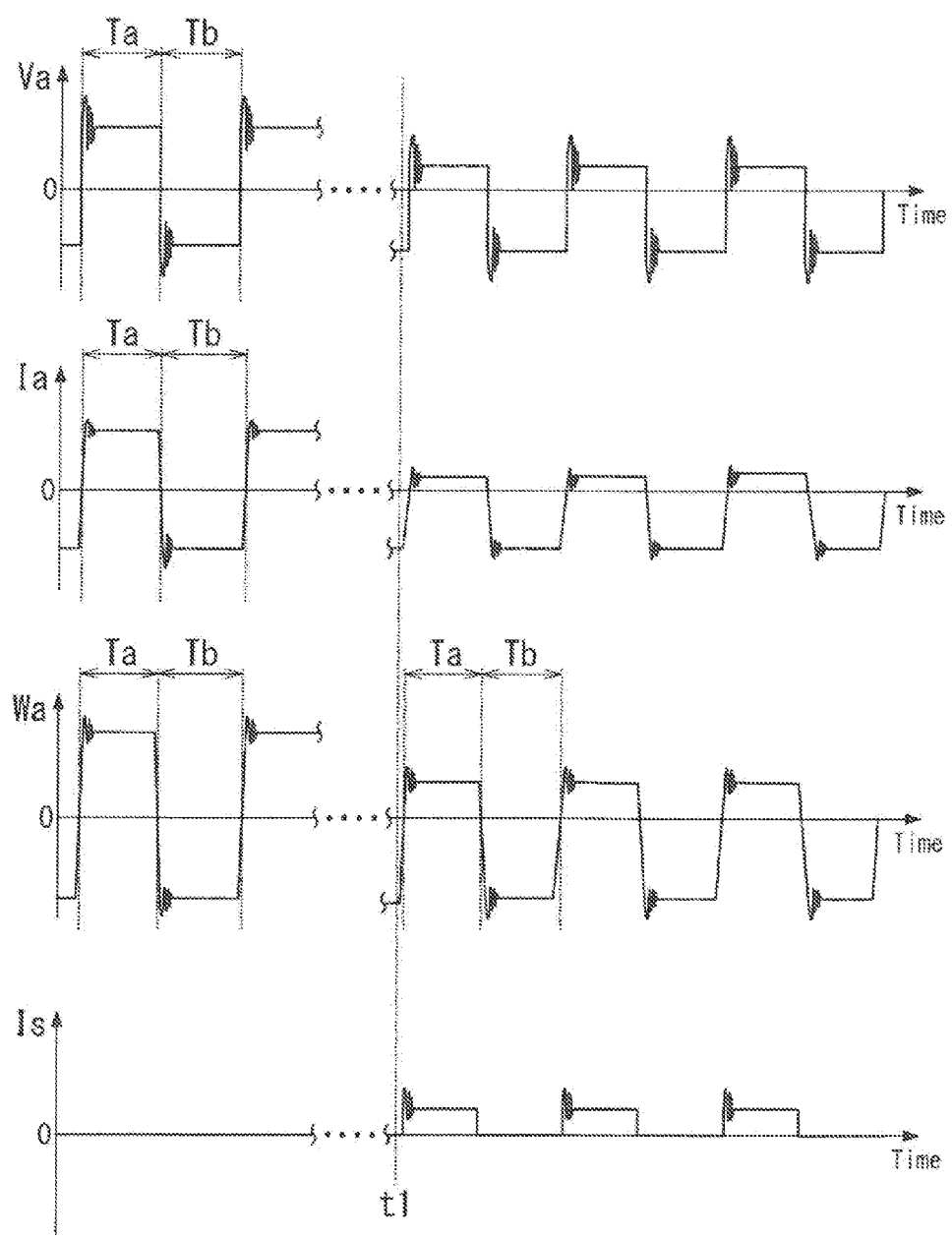
FIG. 2 is a waveform chart of an AC voltage applied to a discharge lamp, AC current flowing through the discharge lamp, AC power supplied to the discharge lamp, and ground fault current flowing through the lighting device.
Figure 3:
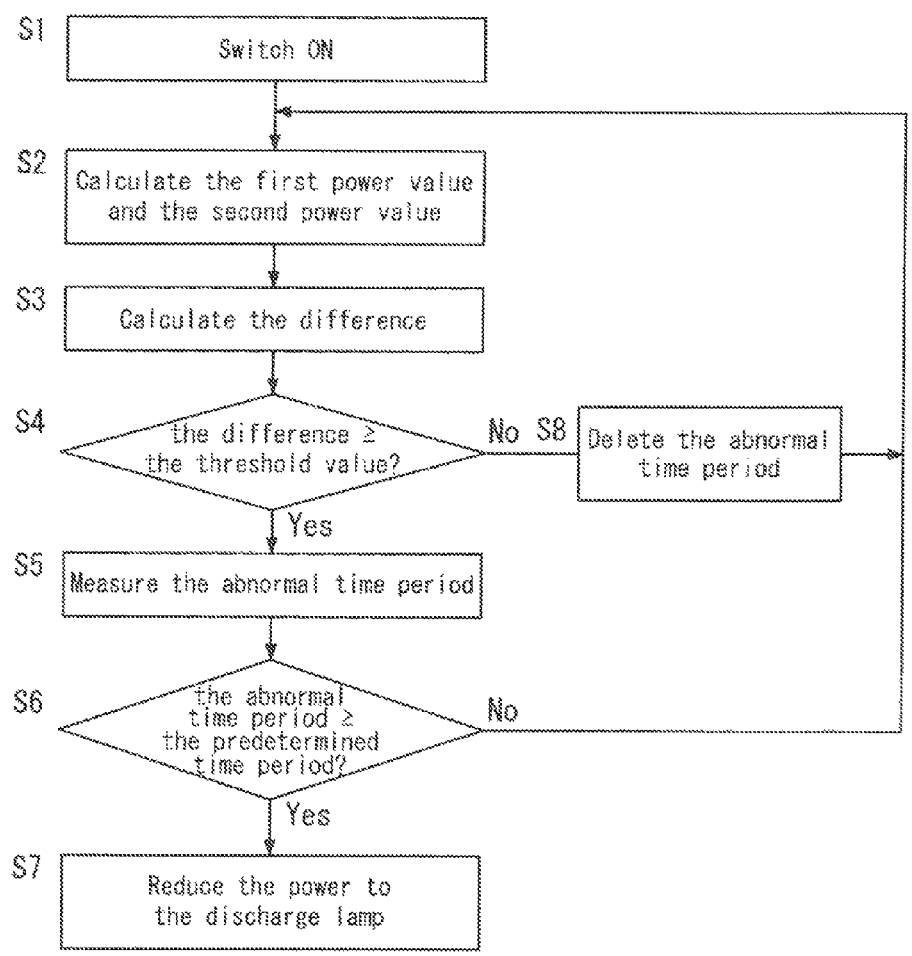
FIG. 3 is a flow chart of operation of a controller of the lighting device of Embodiment 1.
Figure 4:
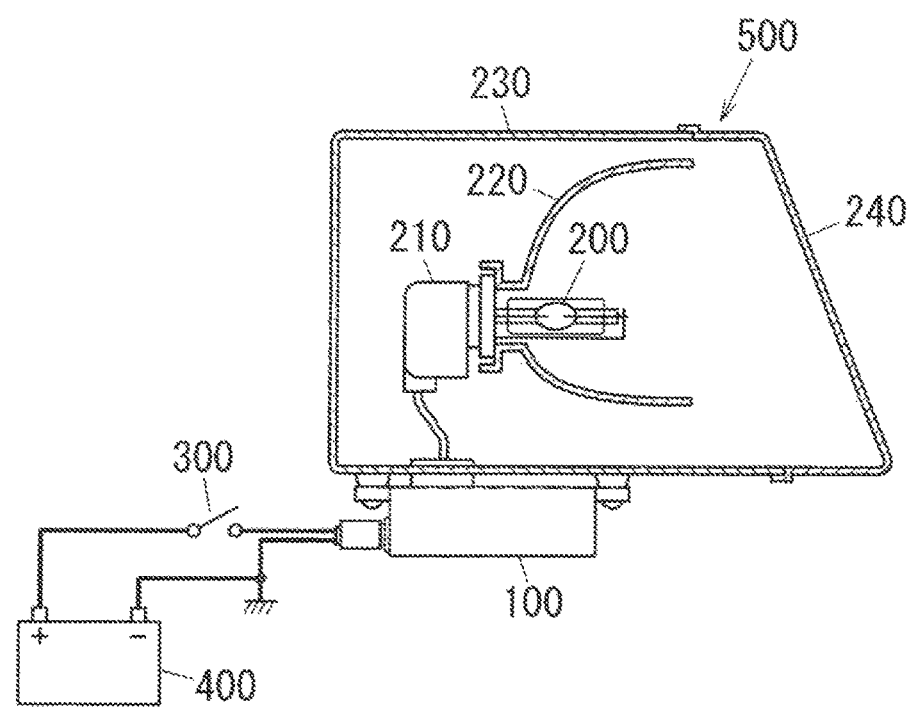
FIG. 4 is a schematic construction diagram of an illuminating device including the lighting device of Embodiment 1.
Figure 5:
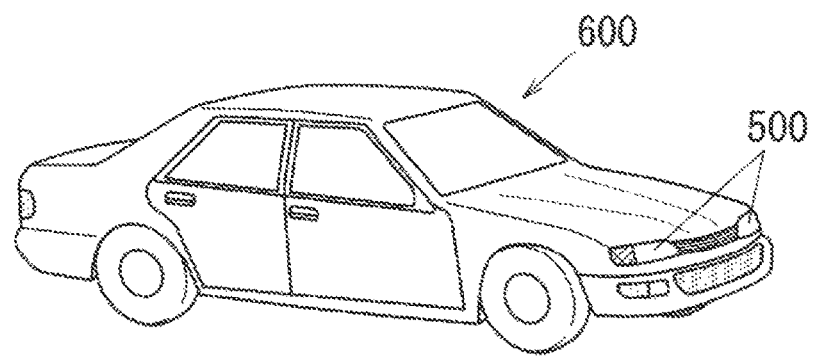
FIG. 5 is a perspective view of a vehicle including illuminating devices.

The following explanations referring to FIG. 1 to FIG. 3 are given to describe a lighting device 100 of Embodiment 1 according to the present disclosure. Note that, for convenience, explanations referring to FIG. 4 and FIG. 5 are given first to describe an illuminating device 500 including the lighting device 100, and then explanations are given to describe the lighting device 100 in detail.

The illuminating device 500 is designed to be attached to a vehicle 600 such as an automobile, for example. The illuminating device 500 is a headlight, for example.

The illuminating device 500 includes the lighting device 100, a discharge lamp 200, a socket 210, a reflector 220, a casing 230, and a cover 240, for example.

The discharge lamp 200 is an HID (High Intensity Discharge) lamp, for example. The discharge lamp 200 includes a pair of electrodes X1 and X2 (see FIG. 1). Hereinafter, for convenience, the electrode X1 may be referred to as "first electrode X1", and the electrode X2 may be referred to as "second electrode X2".

The socket 210 is designed to hold the discharge lamp 200.

The reflector 220 is designed to reflect light emitted from the discharge lamp 200 toward the cover 240.

The casing 230 is designed to accommodate the discharge lamp 200, the socket 210, and the reflector 220. The casing 230 has a box shape (e.g., a rectangular box shape) with a surface having an opening.

The cover 240 is attached to the casing 230 so as to cover the surface of the casing 230. The cover 240 is made of transparent or translucent material.

The lighting device 100 is configured to light (or operate) the discharge lamp 200. Note that, the lighting device 100 does not include the discharge lamp 200.

The lighting device 100 is to be electrically connected a DC power source 400 via a switch 300. The switch 300 is used in order to start or stop supply of power from the DC power source 400 to the lighting device 100. The DC power source 400 is configured to output a DC voltage. The DC power source 400 is a battery, for example. Preferably, the DC power source 400 is an automotive battery in the case where the illuminating device 500 is attached to an automobile, for example. Note that, the lighting device 100 does not include the switch 300 and the DC power source 400.

As shown in FIG. 1, the lighting device 100 includes a pair of input terminals 1A and 1B, a pair of output terminals 2A and 2B, a DC power supply 3, an inverter 4, an igniter 5, a voltage detector 6, a current detector 7, and a controller 8. The DC power supply 3, the inverter 4, and the igniter 5 constitute a lighting circuit 10.

The DC power source 400 is to be electrically connected between the pair of input terminals 1A and 1B. The switch 300 is to be connected between the DC power source 400 and the input terminal 1A. In more detail, the input terminal 1A is to be electrically connected to a positive terminal of the DC power source 400 through the switch 300, for example. The input terminal 1B is to be electrically connected to a negative terminal of the DC power source 400, for example.

The discharge lamp 200 is to be electrically connected between the pair of output terminals 2A and 2B. In more detail, the output terminal 2A is to be electrically connected to the second electrode X2 of the discharge lamp 200. The output terminal 2B is to be electrically connected to the first electrode X1 of the discharge lamp 200.

The DC power supply 3 is configured to convert a DC voltage outputted from the DC power source 400 into a predetermined DC voltage. Further, the DC power supply 3 is configured to output the predetermined DC voltage.

The DC power supply 3 includes a switching element Q1, a transformer T1, a diode D1, and a capacitor C1, for example.

The switching element Q1 includes a first terminal, a second terminal, and a control terminal. The switching element Q1 is an enhancement-mode n-channel MOSFET, for example. In this case, the first terminal, the second terminal, and the control terminal of the switching element Q1 are defined by a drain terminal, a source terminal, and a gate terminal, respectively. Note that, the switching element Q1 is not limited to an n-channel MOSFET but may be a bipolar transistor or the like.

The transformer T1 includes a primary winding T11 whose first end is electrically connected to the input terminal 1A. The primary winding T11 of the transformer T1 has a second end electrically connected to the drain terminal of the switching element Q1. The source terminal of the switching element Q1 is electrically connected to the input terminal 1B. The gate terminal of the switching element Q1 is electrically connected to the controller 8.

The transformer T1 includes a secondary winding T12 whose first end is electrically connected to an anode of the diode D1. The diode D1 has a cathode electrically connected to a first end of the capacitor C1 (a high voltage side connection terminal of the capacitor C1). The capacitor C1 has a second end (a low voltage side connection terminal of the capacitor C1) electrically connected to a second end of the secondary winding T12 of the transformer T1. The second end of the secondary winding T12 of the transformer T1 is electrically connected to the source terminal of the switching element Q1.

The voltage detector 6 is connected in parallel with the capacitor C1.

The inverter 4 is configured to convert the predetermined DC voltage outputted from the DC power supply 3 into an AC voltage. Further, the inverter 4 is configured to apply a resultant AC voltage to the discharge lamp 200.

In the present embodiment, the AC voltage is a rectangular AC voltage (see FIG. 2). This AC voltage has a positive half period Ta and a negative half period Tb, and the positive half period Ta and the negative half period Tb have the same length. Note that, the AC voltage may be a sinusoidal AC voltage, or a non-sinusoidal AC voltage other than the rectangular AC voltage. Further, the positive half period Ta and the negative half period Tb may have different lengths. Note that, in the following explanations, the positive half period Ta is referred to as a first half period, and the negative half period Tb is referred to as a second half period. However, the positive half period Ta may be treated as a second half period, and the negative half period Tb may be treated as a first half period.

The inverter 4 is a full-bridge circuit, for example. The inverter 4 includes four switching elements Q2 to Q5.

Each of the switching elements Q2 to Q5 includes a first terminal, a second terminal, and a control terminal. Each of the switching elements Q2 to Q5 is a depletion-mode n-channel MOSFET, for example. In this case, in each of the switching elements Q2 to Q5, the first terminal, the second terminal, and the control terminal are defined by a drain terminal, a source terminal, and a gate terminal, respectively.

The drain terminals of the switching elements Q2 and Q3 are electrically connected to the first end of the capacitor C1. The gate terminals of the switching elements Q2 and Q3 are electrically connected to the controller 8. The source terminals of the switching elements Q2 and Q3 are electrically connected to the drain terminals of the switching elements Q4 and Q5, respectively. Further, the source terminals of the switching elements Q2 and Q3 are electrically connected to the igniter 5. The gate terminals of the switching elements Q4 and Q5 are electrically connected to the controller 8. The source terminals of the switching elements Q4 and Q5 are electrically connected to the second end of the capacitor C1 through the current detector 7.

The igniter 5 is configured to generate a high voltage pulse to start the discharge lamp 200. The igniter 5 includes a capacitor C2, a transformer T2, and a discharge gap device 9, for example.

The capacitor C2 has a first end electrically connected to the source terminal of the switching element Q2. Further, the first end of the capacitor C2 is electrically connected to the drain terminal of the switching element Q4. The capacitor C2 has a second end electrically connected to the source terminal of the switching element Q3. Further, the second end of the capacitor C2 is electrically connected to the drain terminal of the switching element Q5.

The transformer T2 includes a primary winding T21 whose first end is electrically connected to the first end of the capacitor C2. Further, the first end of the primary winding T21 of the transformer T2 is electrically connected to the output terminal 2A through a secondary winding T22 of the transformer T2.

The primary winding T21 of the transformer T2 has a second end electrically connected to the second end of the capacitor C2 through the discharge gap device 9. Further, the second end of the primary winding T21 of the transformer T2 is electrically connected to the output terminal 2B through the discharge gap device 9.

The voltage detector 6 is configured to measure a voltage corresponding to the AC voltage Va (see FIG. 1 and FIG. 2) to be applied to the discharge lamp 200. In short, the voltage detector 6 is configured to measure a voltage value of the AC voltage Va to be applied to the discharge lamp 200. The voltage detector 6 includes two resistors R1 and R2.

The resistor R1 has a first end electrically connected to the first end of the capacitor C1. The resistor R1 has a second end electrically connected to a first end of the resistor R2. Further, the second end of the resistor R1 is electrically connected to the controller 8. The resistor R2 has a second end electrically connected to the second end of the capacitor C1. Note that, the voltage corresponding to the AC voltage Va to be applied to the discharge lamp 200 corresponds to a voltage across the capacitor C1. In other words, the voltage corresponding to the AC voltage Va to be applied to the discharge lamp 200 corresponds to the predetermined DC voltage produced by conversion by the DC power supply 3.

The current detector 7 is configured to measure current corresponding to AC current Ia (see FIG. 1 and FIG. 2) flowing through the discharge lamp 200. In short, the current detector 7 is configured to measure a current value of the AC current Ia flowing through the discharge lamp 200. The current detector 7 includes a resistor R3.

The resistor R3 has a first end electrically connected to the second end of the resistor R2. The second end of the resistor R3 is electrically connected to the source terminal of the switching element Q4. Further, the second end of the resistor R3 is electrically connected to the source terminal of the switching element Q5. Additionally, the second end of the resistor R3 is electrically connected to the controller 8. Note that, the current corresponding to the AC current Ia flowing through the discharge lamp 200 corresponds to current flowing through the resistor R3.

The controller 8 is constituted by a microcomputer, for example. The microcomputer includes one or more memories (e.g., non-volatile, computer readable memories) storing one or more programs executed by the microcomputer for carrying out the functions as described herein. The one or more programs define one or more operation modes of the lighting device 100, and/or the like, for example. Note that, the microcomputer can be, for example, one or more microprocessors or one or more microcontrollers.

The controller 8 is configured to control the lighting circuit 10. The controller 8 includes a driver 81, a calculator 82, a determiner 83, and a timer 84, for example. The driver 81 is implemented by one or more CPU and one or more digital-to-analog (D/A) converters incorporated in the microcomputer. Each of the calculator 82 and the determiner 83 is realized by one or more CPU and one or more program. The timer 84 is constituted by a counter incorporated in the microcomputer. Note that, the timer 84 is constituted by a counter, and alternatively may be constituted by one or more built-in timers incorporated in the microcomputer. Note that, details of the driver 81, the calculator 82, the determiner 83, and the timer 84 are described later.

The controller 8 is configured to control the DC power supply 3. In more detail, the controller 8 is configured to control the switching element Q1. Especially, in the controller 8, the driver 81 is configured to turn on and off the switching element Q1.

In the DC power supply 3, when the driver 81 switches the switching element Q1 to an on state, current flows through a path including the input terminal 1A, the primary winding T11 of the transformer T1, the switching element Q1, and the input terminal 1B in this order. As a result, in the DC power supply 3, magnetic energy is stored in the primary winding T11 of the transformer T1.

Further, in the DC power supply 3, when the driver 81 switches the switching element Q1 from the on state to an off state, the magnetic energy stored in the primary winding T11 of the transformer T1 is transferred to the secondary winding T12 of the transformer T1, and thus a voltage (inductive voltage) is produced across this secondary winding T12. In the DC power supply 3, when the inductive voltage is produced across the secondary winding T12 of the transformer T1, current flows through a path including the secondary winding T12, the diode D1, and the capacitor C1 in this order. Consequently, in the DC power supply 3, the capacitor C1 is charged. When a voltage across the capacitor C1 is equal to or greater than a first predetermined voltage, a voltage outputted from the DC power supply 3 reaches the predetermined DC voltage.

The controller 8 is further configured to control the inverter 4. In more detail, the controller 8 controls the four switching elements Q2 to Q5 so that a pair of the switching elements Q2 and Q5 and a pair of the switching elements Q3 and Q4 are switched to on states alternately. Especially, in the controller 8, the driver 81 is configured to individually turn on and off the four switching elements Q2 to Q5 so that the pair of the switching elements Q2 and Q5 and the pair of the switching elements Q3 and Q4 are switched to on states alternately. Consequently, the inverter 4 converts the predetermined DC voltage outputted from the DC power supply 3 into an AC voltage with a rectangular waveform. Note that, in the lighting device 100, the driver 81 is configured to individually turn on and off the five switching elements Q1 to Q5.

Further, the controller 8 is configured to measure the DC voltage outputted from the DC power source 400. In detail, the controller 8 is electrically connected to the input terminal 1A. In more detail, one or more analog-to-digital (A/D) converters of the microcomputer are electrically connected to the input terminal 1A. Therefore, the controller 8 determines whether the switch 300 is in an on state or an off state by virtue of whether a voltage is present at the input terminal 1A.

In the lighting device 100, when the switch 300 is switched from the off state to the on state, a voltage across the capacitor C1 of the DC power supply 3 increases because the pair of electrodes X1 and X2 of the discharge lamp 200 are isolated. Additionally, when the switch 300 is switched from the off state to the on state, the controller 8 individually controls the four switching elements Q2 to Q5 so that the two switching elements Q2 and Q5 are in the on states and the two switching elements Q3 and Q4 are in the off states. This leads to an increase in a voltage across the capacitor C2 in the igniter 5 of the lighting device 100.

the lighting device 100, when the voltage across the capacitor C2 is equal to or greater than a second predetermined voltage, a high voltage is triggered by the discharge gap device 9, and therefore the igniter 5 generates a high voltage pulse. This high voltage pulse is applied to the discharge lamp 200. Therefore, the lighting device 100 can start the discharge lamp 200. Starting the discharge lamp 200 means supplying AC power Wa (see FIG. 2) to the discharge lamp 200 so that the discharge lamp 200 starts to light.

When the discharge lamp 200 is started, the controller 8 controls the four switching elements Q2 to Q5 so that the pair of switching elements Q2 and Q5 and the pair of switching elements Q3 and Q4 are switched to on states alternately.

The controller 8 is configured to calculate a power value in the first half period Ta of the AC power Wa (see FIG. 2) supplied to the discharge lamp 200, based on the voltage value of the voltage (AC voltage Va) measured by the voltage detector 6 and the current value of the current (AC current Ia) measured by the current detector 7. Further, the controller 8 is configured to calculate a power value in the second half period Tb of the AC power Wa (see FIG. 2) supplied to the discharge lamp 200, based on the voltage value of the voltage measured by the voltage detector 6 and the current value of the current measured by the current detector 7. Note that, in the following, the power value in the first half period Ta of the AC power Wa supplied to the discharge lamp 200 is referred to as "first power value". In summary, the first power value is a value of power supplied to the discharge lamp 200 in the first half period Ta of the AC voltage Va. Further, in the following, the power value in the second half period Tb of the AC power Wa supplied to the discharge lamp 200 is referred to as "second power value". In summary, the second power value is a value of power supplied to the discharge lamp 200 in the second half period Tb of the AC voltage Va. Note that, in the present embodiment, the unit of each of the first power value and the second power value is W (=J/s). The first power value is defined so as to represent an amount of power supplied during the first half period Ta, and the second power value is defined so as to represent an amount of power supplied during the second half period Tb. For example, the first power value and the second power value may be an instantaneous power value at a predetermined point (e.g., an intermediate point) of time in a half period, an average or total amount of power values supplied during a half period, or the like.

The controller 8 is configured to determine that a ground fault has occurred, when a state (imbalance state) in which the difference between the first power value and the second power value is equal to or greater than a threshold value continues for a predetermined time period (e.g., 10 seconds).

The calculator 82 is configured to calculate the first power value based on the voltage value of the voltage (AC voltage Va) measured by the voltage detector 6 and the current value of the current (AC current Ia) measured by the current detector 7. Further, the calculator 82 is configured to calculate the second power value based on the voltage value of the voltage (AC voltage Va) measured by the voltage detector 6 and the current value of the current (AC current Ia) measured by the current detector 7. Additionally, the calculator 82 is configured to calculate the difference between the first power value and the second power value.

The determiner 83 is configured to determine whether the difference calculated by the calculator 82 is equal to or greater than the threshold value or not. Especially, the determiner 83 is configured to regularly determine whether the difference is smaller than the threshold value.

The timer 84 is configured to calculate an accumulated value (abnormal time period) of the state (imbalance state) in which the difference calculated by the calculator 82 is equal to or greater than the threshold value. In other words, the accumulated value is number of continuous times that the determiner 83 determines that the difference is equal to or greater than the threshold value.

The determiner 83 is configured to determine whether a ground fault has occurred. In more detail, the determiner 83 is configured to whether the abnormal time period calculated by the timer 84 is equal to or greater than the predetermined time period. In other words, the determiner 83 is configured to determine whether the accumulated value is equal to or greater than a predetermined value (corresponding to the predetermined time period).

Hereinafter, operation of the controller 8 (especially, the calculator 82, the determiner 83 and the timer 84) is described with reference to FIG. 3.

When the switch 300 is switched from the off state to the on state (S1 in FIG. 3), the calculator 82 calculates the first power value and the second power value (S2 in FIG. 3). Additionally, the calculator 82 calculates the difference between the first power value and the second power value (S3 in FIG. 3).

The determiner 83 determines whether the difference calculated by the calculator 82 is equal to or greater than the threshold value (S4 in FIG. 3).

When the determiner 83 determines that the difference is equal to or greater than the threshold value (S4 in FIG. 3: Yes), the timer 84 measures the abnormal time period (S5 in FIG. 3).

The determiner 83 determines whether the abnormal time period measured by the timer 84 is equal to or greater than the predetermined time period (S6 in FIG. 3).

When the abnormal time period is determined to be equal to or greater than the predetermined time period (S6 in FIG. 3: Yes), the determiner 83 determines that a ground fault has occurred.

When the determiner 83 determines that a ground fault has occurred, the controller 8 controls the DC power supply 3 and the inverter 4 to decrease the AC power Wa supplied to the discharge lamp 200 (S7 in FIG. 3).

On the other hand, in step S6, when the determiner 83 determines that the abnormal time period is shorter than the predetermined time period (S6 in FIG. 3: No), the calculator 82 calculates the first power value and the second power value again (S2 in FIG. 3).

When the determiner 83 determines that the difference is smaller than the threshold value (S4 in FIG. 3: No), the controller 8 deletes (resets) the abnormal time period measured by the timer 84 (S8 in FIG. 3).

Further, after deletion of the abnormal time period measured by the timer 84, the calculator 82 calculates the first power value and the second power value again (S2 in FIG. 3).

In the lighting device 100, operations of the calculator 82 and the determiner 83 are realized by one or more programs stored in the microcomputer serving as the controller 8, but may be realized by another configuration.

Note that, when the determiner 83 determines that a ground fault has occurred, the controller 8 controls the DC power supply 3 and the inverter 4 to decrease (reduce) the AC power Wa to the discharge lamp 200. In an alternative example, when the determiner 83 determines that a ground fault has occurred, the controller 8 controls the DC power supply 3 and the inverter 4 to stop (terminate) supply of the AC power Wa to the discharge lamp 200.

In the lighting device 100, for example, when a resistance component (hereinafter, referred to as "ground fault resistance") Rs occurs between the first electrode X1 of the discharge lamp 200 (as represented in FIG. 1) and a ground of the lighting device 100, a ground fault is likely to occur. In the lighting device 100, when a ground fault has occurred, current (hereinafter referred to as "ground fault current") Is flows through a path indicated by a bold arrow shown in FIG. 1. As a result, the lighting device 100 may see decreases in the AC voltage Va applied to the discharge lamp 200, the AC current Ia flowing through the discharge lamp 200, and the AC power Wa supplied to the discharge lamp 200.

In the lighting device 100, when a ground fault has occurred, each of waveforms of the AC voltage Va applied to the discharge lamp 200, the AC current Ia flowing through the discharge lamp 200, and the AC power Wa supplied to the discharge lamp 200 shows an asymmetry between opposite polarities (positive and negative polarities). In other words, in the lighting device 100, occurrence of a ground fault may lead to a difference (unnatural difference) between the power value (first power value) in the first half period Ta of the AC power Wa supplied to the discharge lamp 200 and the power value (second power value) in the second half period Tb of the AC power Wa supplied to the discharge lamp 200. Note that, t1 in FIG. 2 represents a time point at which a ground fault has occurred.

In the lighting device 100, the controller 8 calculates the first power value and the second power value, based on the voltage value of the voltage (AC voltage Va) measured by the voltage detector 6 and the current value of the current (AC current Ia) measured by the current detector 7. Further, in the lighting device 100, the controller 8 determines that a ground fault has occurred, when the state in which the difference between the first power value and the second power value is equal to or greater than the threshold value continues for the predetermined time period. Hence, the lighting device 100 can detect a ground fault more successfully than discharge lamp lighting devices disclosed in Document 1.

1.2 Modification 1

In starting the discharge lamp 200, the lighting device 100 supplies the discharge lamp 200 with AC power greater than the lighting power Wb (see FIG. 6) of the discharge lamp 200, in order to ensure visibility in front of the vehicle 600 early.

Figure 6:
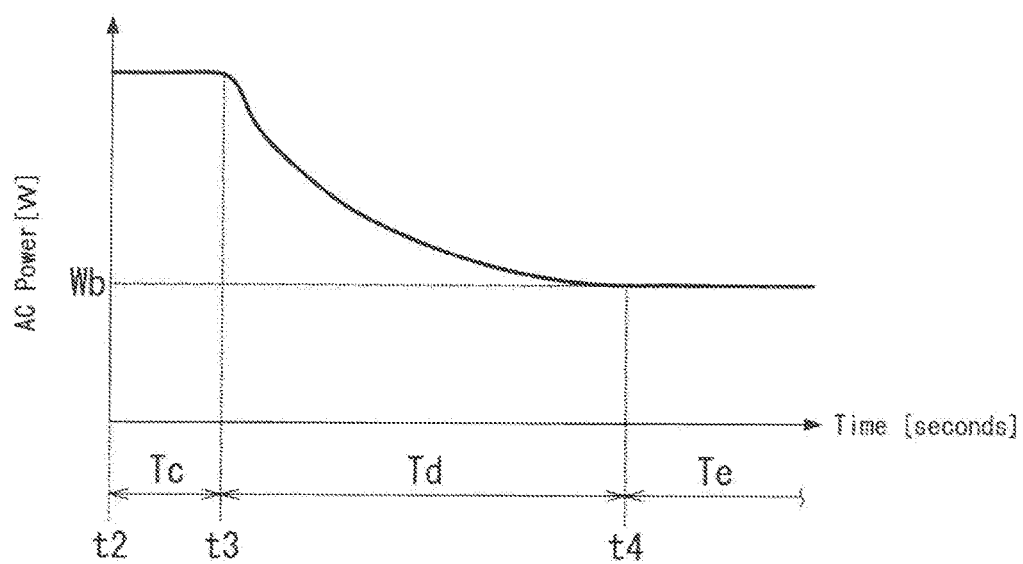
FIG. 6 is a graph of variation of the AC power supplied from the lighting device of Embodiment 1 to the discharge lamp.

As shown in FIG. 6, after a lapse of a time period Tc for starting the discharge lamp 200, the lighting device 100 gradually decreases the AC power supplied to the discharge lamp 200, and thereby supplies the lighting power Wb to the discharge lamp 200. FIG. 6 shows Td which indicates a time period in which the AC power supplied to the discharge lamp 200 is gradually decreased. FIG. 6 shows Te which indicates a time period in which the lighting power Wb is supplied to the discharge lamp 200.

FIG. 6 shows t2 which indicates a time point at which the discharge lamp 200 is started. FIG. 6 shows t3 which indicates a time point at which the AC power supplied to the discharge lamp 200 is decreased gradually. FIG. 6 shows t4 which indicates a time point at which supply of the lighting power Wb to the discharge lamp 200 is started. Note that, the lighting power Wb of the discharge lamp 200 means AC power which allows the discharge lamp 200 to light stably.

In the following, the time period Tc for starting the discharge lamp 200 is referred to as "start time period Tc". The time period Td in which the AC power supplied to the discharge lamp 200 is decreased gradually is referred to as "change time period Td". The time period Te in which the lighting power Wb is supplied to the discharge lamp 200 is referred to as "lighting time period Te".

In the lighting device 100, during a time period from the time point t2 at which the discharge lamp 200 is started to the time point t4 at which supply of the lighting power Wb to the discharge lamp 200 is started (the start time period Tc and the change time period Td in FIG. 6), the lighting state of the discharge lamp 200 is unstable. For this reason, in the lighting device 100, even if a ground fault has not yet occurred, the difference between the first power value and the second power value is likely to increase, and hence the determiner 83 may determine that a ground fault has occurred.

In the present modification, the determiner 83 has (stores) multiple threshold values. The determiner 83 is configured to select one threshold value from the multiple threshold values so that the threshold value becomes smaller as time elapses from a time at which the discharge lamp 200 is started by the igniter 5. In other words, the determiner 83 has (stores) multiple candidates for the threshold value, and is configured to select the threshold value from the multiple candidates so that the threshold value decreases with an increase in time which elapses from start of the discharge lamp 200.

The determiner 83 has (stores) two threshold values (a first threshold value and a second threshold value), for example. The second threshold value is smaller than the first threshold value.

For example, the determiner 83 selects the first threshold value until predetermined time elapses from the time point t2 at which the discharge lamp 200 is started by the igniter 5 (before the time point t4 in FIG. 6). For example, after a lapse the predetermined time (after the time point t4 in FIG. 6), the determiner 83 selects the second threshold value.

In summary, the determiner 83 selects the first threshold value throughout the start time period Tc and the change time period Td. Further, the determiner 83 selects the second threshold value throughout the lighting time period Te.

Accordingly, it is possible to prevent the determiner 83 of the lighting device 100 from accidentally determining that a ground fault has occurred during the start time period Tc and the change time period Td, for example. Therefore, the lighting device 100 can detect a ground fault more and more successfully.

Note that, the determiner 83 has two threshold values but may have three or more threshold values, for example.

1.3 Modification 2

When the lighting device 100 starts the discharge lamp 200, the discharge lamp 200 may have a low temperature. If that is the case, even if a ground fault has not yet occurred, the difference between the first power value and the second power value is likely to increase, the determiner 83 of the lighting device 100 may determine that a ground fault has occurred. Note that, a state where the discharge lamp 200 has a low temperature means a state where the discharge lamp 200 gets cold and thereby has a stable temperature, which means a state of initial start (cold start).

In the present modification, the determiner 83 has (stores) multiple threshold values. The determiner 83 is configured to select one threshold value from the multiple threshold values so that the threshold value becomes larger as time elapses from the time at which the discharge lamp 200 is turned off. In other words, the determiner 83 has (stores) multiple candidates for the threshold value, and is configured to select the threshold value from the multiple candidates so that the threshold value decreases with a decrease in time which elapses from start of the discharge lamp 200.

For example, the determiner 83 has (stores) two threshold values (a third threshold value and a fourth threshold value). The fourth threshold value is smaller than the third threshold value.

The determiner 83 selects the third threshold value when time elapsing from turning-off of the discharge lamp 200 is relatively long. Further, the determiner 83 selects the fourth threshold value when time elapsing from turning-off of the discharge lamp 200 is relatively short.

Hence, it is possible to prevent the determiner 83 of the lighting device 100 from accidentally determining that a ground fault has occurred while the discharge lamp 200 has a low temperature. Therefore, the lighting device 100 can detect a ground fault more and more successfully.

A state where time elapsing from turning-off of the discharge lamp 200 is relatively long means the state where the discharge lamp 200 gets cold and thereby has a constant temperature, which means the state of initial start (cold start). Further, a state where time elapsing from turning-off of the discharge lamp 200 is relatively short means the state where the discharge lamp 200 is turned on (started) again immediately after the discharge lamp 200 is turned off, for example.

Note that, the determiner 83 has two threshold values but may have three or more threshold values, for example.

1.4 Modification 3

In the lighting device 100, for example, when a ground fault occurs when the discharge lamp 200 is started (the time point t2 in FIG. 6), a ground fault current Is is likely to increase because the discharge lamp 200 is supplied with the AC power higher than the lighting power Wb of the discharge lamp 200. Further, in the lighting device 100, when the discharge lamp 200 is lit while a ground fault current Is flows, the lighting device 100 is likely to be broken.

In the present modification, the determiner 83 is configured to shorten the predetermined time period (the first predetermined time period) used before a lapse of the predetermined time from the time point t2 of starting the discharge lamp 200 by the igniter 5, relative to the predetermined time period (the second predetermined time period) used after a lapse the predetermined time. In other words, the determiner 83 is configured to: select the first predetermined time period as the predetermined time period until the predetermined time elapses from start of the discharge lamp 200; and select the second predetermined time period longer than the first predetermined time period as the predetermined time period after a lapse of the predetermined time from the start of the discharge lamp 200.

In more detail, the determiner 83 shortens the predetermined time period (the first predetermined time period) for the start time period Tc and the change time period Td relative to the predetermined time period (the second predetermined time period) for the lighting time period Te.

Accordingly, when a ground fault occurs in starting the discharge lamp 200 for example, the determiner 83 of the lighting device 100 can relatively early determine that a ground fault has occurred. Therefore, it is possible to suppress malfunction of the lighting device 100.

1.5 Modification 4

In the lighting device 100, even while a ground fault current Is flows, the difference may become smaller than the threshold value when the ground fault resistance Rs disappears due to vibration of the vehicle 600 or the like, for example. Further, when the ground fault resistance Rs occurs again after the difference becomes smaller than the threshold value, the lighting device 100 sees a flow of the ground fault current Is again. As a result, excessive stress may be accumulated on multiple electronic parts constituting the lighting device 100 or the like. This may lead to a decrease in lifetime of the lighting device 100.

The controller 8 is configured to, when the difference becomes smaller than the threshold value before the state in which the difference is equal to or greater than the threshold value continues for the predetermined time period, decrease the predetermined time period with a decrease in a time period in which the difference is smaller than the threshold value (hereinafter, referred to as "normal time period"). In summary, the controller 8 is configured to, when the difference becomes smaller than the threshold before the imbalance state continues for the predetermined time period, and then the difference becomes equal to or greater than the threshold, change the predetermined time period so that the predetermined time period decreases with a decrease in a time period in which the difference is kept smaller than the threshold.

In more detail, the controller 8 measures a normal time period by the timer 84 when the difference becomes smaller than the threshold value before the state in which the difference is equal to or greater than the threshold value continues for the predetermined time period. Further, the controller 8 decreases the predetermined time period as the normal time period measured by the timer 84 is shorter.

Accordingly, in the lighting device 100, even if a ground fault resistance Rs appears and disappears repeatedly due to vibration of the vehicle 600 or the like for example, it is possible to suppress excessive stress from being accumulated on multiple electronic parts constituting the lighting device 100 or the like. Therefore, a decrease in lifetime of the lighting device 100 can be suppressed.

1.6 Other Modifications

The controller 8 may be configured to turn on and off the switching element Q1 of the DC power supply 3 based on a voltage measured by the voltage detector 6. Accordingly, the lighting device 100 can adjust the above predetermined DC voltage outputted from the DC power supply 3. In other words, the lighting device 100 is allowed to adjust the AC voltage Va to be applied to the discharge lamp 200. As a result, the lighting device 100 can stabilize the lighting state of the discharge lamp 200.

The controller 8 may be configured to turn on and off the switching element Q1 of the DC power supply 3 based on current measured by the current detector 7. Accordingly, the lighting device 100 can adjust the above predetermined DC voltage outputted from the DC power supply 3. In other words, the lighting device 100 is allowed to adjust the AC current Ia flowing through the discharge lamp 200. As a result, the lighting device 100 can stabilize the lighting state of the discharge lamp 200.

1.7 Conclusion

The above-described lighting device 100 is a lighting device for lighting the discharge lamp 200. The lighting device 100 includes: the DC power supply 3 to output a DC voltage, the inverter 4 to convert the DC voltage into the AC voltage Va and apply the AC voltage Va to the discharge lamp 200; and the igniter 5 to generate a high voltage pulse to start the discharge lamp 200. Additionally, the lighting device 100 includes: the voltage detector 6 to measure a voltage corresponding to the AC voltage Va to be applied to the discharge lamp 200; the current detector 7 to measure current corresponding to the AC current Ia flowing through the discharge lamp 200; and the controller 8 to individually control the DC power supply 3 and the inverter 4. The controller 8 is to calculate the first power value defined as a power value in the first half period Ta of the AC power Wa to be supplied to the discharge lamp 200 and the second power value defined as a power value in the second half period Tb of the AC power Wa to be supplied to the discharge lamp 200, based on the voltage value of the voltage measured by the voltage detector 6 and the current value of the current measured by the current detector 7. Additionally, the controller 8 is to, when a state in which a difference between the first power value and the second power value is equal to or greater than the threshold value continues for the predetermined time period, determine that a ground fault has occurred.

Accordingly, the lighting device 100 can detect a ground fault more successfully than discharge lamp lighting devices disclosed in Document 1.

As described above, the controller 8 preferably includes: the calculator 82 to calculate the difference based on the voltage value of the voltage measured by the voltage detector 6 and the current value of the current measured by the current detector 7; and the determiner 83 to determine whether a ground fault has occurred. Preferably, the determiner 83 is to, when a state in which the difference calculated by the calculator 82 is equal to or greater than the threshold value continues for the predetermined time period, determine that a ground fault has occurred.

Accordingly, the lighting device 100 can detect a ground fault more successfully than discharge lamp lighting devices disclosed in Document 1.

Preferably, the determiner 83 includes multiple threshold values. Preferably, the determiner 83 is configured to select one threshold value from the multiple threshold values in consideration of time which passes from a time at which the discharge lamp 200 is started by the igniter 5. Preferably, the multiple threshold values are set so as to allow selecting a smaller one from the multiple threshold values with an increase in time which passes from the time at which the discharge lamp 200 is started by the igniter 5.

Accordingly, it is possible to prevent the determiner 83 of the lighting device 100 from accidentally determining that a ground fault has occurred during the start time period Tc and the change time period Td, for example. Therefore, the lighting device 100 can detect a ground fault more and more successfully.

Preferably, the determiner 83 includes multiple threshold values. Preferably, the determiner 83 is configured to select one threshold value from the multiple threshold values in consideration of time which passes from a time at which the discharge lamp 200 is turned off. Preferably, the multiple threshold values are set so as to allow selecting a smaller one from the multiple threshold values with a decrease in time which passes from the time at which the discharge lamp 200 is turned off.

Accordingly, it is possible to prevent the determiner 83 of the lighting device 100 from accidentally determining that a ground fault has occurred while the discharge lamp 200 has a low temperature, for example. Therefore, the lighting device 100 can detect a ground fault more and more successfully.

Preferably, the determiner 83 selects the first predetermined time period and the second predetermined time period so that the first predetermined time period is shorter than the second predetermined time period. The first predetermined time period is defined as the predetermined time period used before a lapse of the predetermined time period from the time at which the discharge lamp 200 is started by the igniter 5. The second predetermined time period is defined as the predetermined time period used after a lapse of the predetermined time period.

Accordingly, when a ground fault occurs in starting the discharge lamp 200 for example, the determiner 83 of the lighting device 100 can relatively early determine that a ground fault has occurred. Therefore, it is possible to suppress malfunction of the lighting device 100.

Preferably, the controller 8 is to, when the determiner 83 determines that a ground fault has occurred, control the DC power supply 3 and the inverter 4 to reduce the AC power Wa supplied to the discharge lamp 200 or stop supply of the AC power Wa to the discharge lamp 200.

Accordingly, it is possible to suppress excessive stress from being accumulated on multiple electronic parts constituting the lighting device 100 or the like. Therefore, a decrease in lifetime of the lighting device 100 can be suppressed.

Preferably, the controller 8 is configured to, when the difference becomes smaller than the threshold value before a state where the difference is equal to or greater than the threshold value continues for the predetermined time period, shorten the predetermined time period as a period of a state where the difference is smaller than the threshold value is shorter.

Accordingly, in the lighting device 100, even if a ground fault resistance Rs appears and disappears repeatedly due to vibration of the vehicle 600 or the like for example, it is possible to suppress excessive stress from being accumulated on multiple electronic parts constituting the lighting device 100 or the like. Therefore, a decrease in lifetime of the lighting device 100 can be suppressed.

The illuminating device 500 described above includes the lighting device 100 and the discharge lamp 200 to be lit by the lighting device 100.

Hence, it is possible to propose the illuminating device 500 which includes the lighting device 100 capable of more successfully detecting a ground fault.

2. Embodiment 2

2.1 Structure

Figure 7:
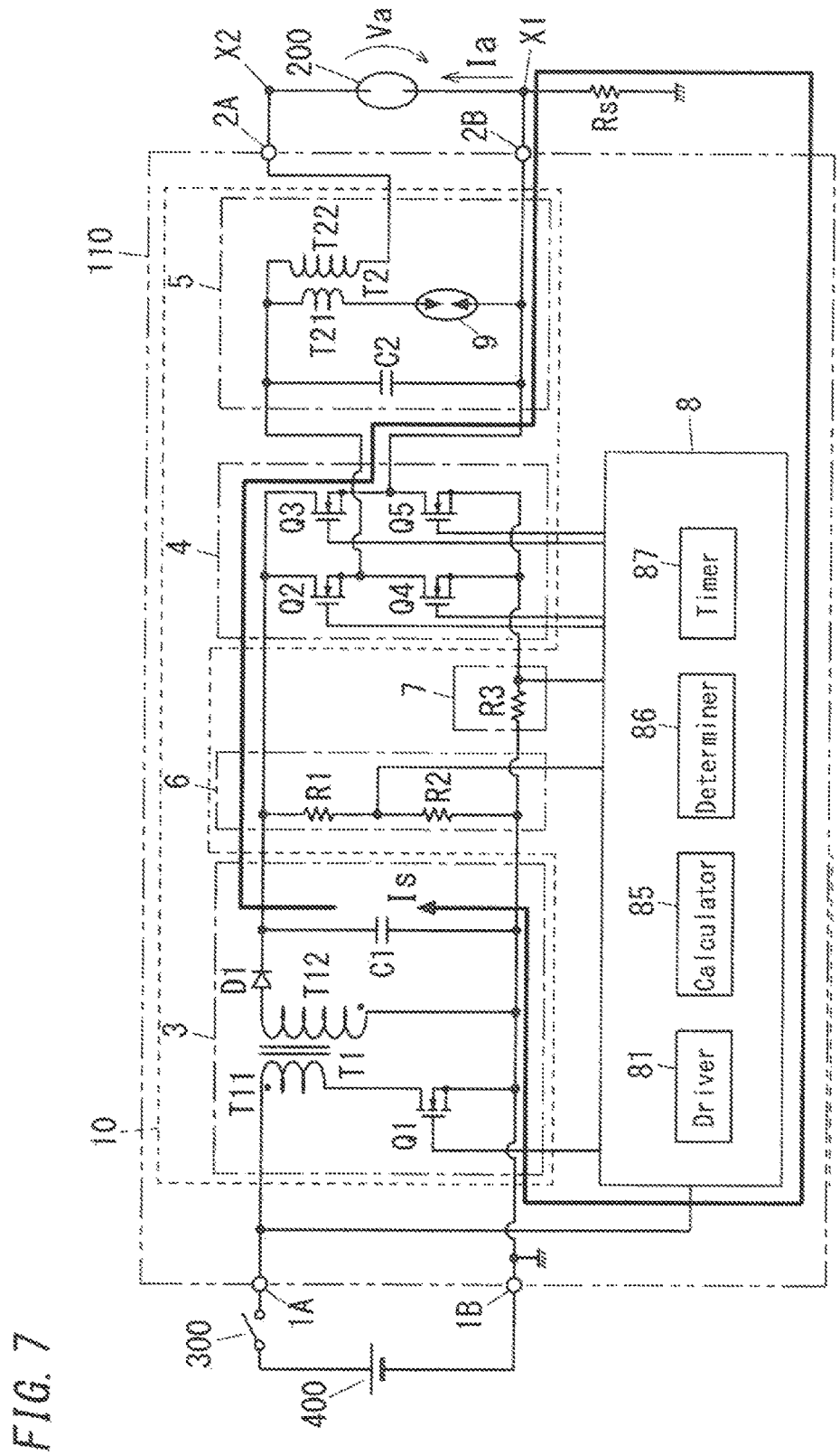
FIG. 7 is a circuit diagram of a lighting device of Embodiment 2.

FIG. 7 shows that a lighting device 110 of Embodiment 2 has the same basic structure as the lighting device 100 of Embodiment 1. Further, the lighting device 110 is mainly different from the lighting device 100 in that the controller 8 includes a calculator 85, a determiner 86, and a timer 87 which differ from the calculator 82, the determiner 83, and the timer 84 of the lighting device 100 respectively. Note that, to avoid redundant explanations, components of the lighting device 110 of Embodiment 2 which are the same as those of the lighting device 100 of Embodiment 1 are designated by the reference signs already used for the lighting device 100 of Embodiment 1. Note that, the lighting device 110 may be used for the illuminating device 500 as an alternative to the lighting device 100 of Embodiment 1.

The calculator 85 is configured in a similar manner to the calculator 82. However, the calculator 85 is configured to calculate a product of the difference and a time period (abnormal time period) of the state (imbalance state) in which the difference is equal to or greater than the threshold value. In summary, the calculator 85 is configured to calculate the difference based on the voltage value measured by the voltage detector 6 and the current value measured by the current detector 7 and calculate the product of the difference and a time period for which the imbalance state continues.

The determiner 86 is configured in a similar manner to the determiner 83. However, the determiner 86 is configured to determine whether the product calculated by the calculator 85 is equal to or greater than the prescribed value or not.

The timer 87 is configured in a similar manner to the timer 84. Further, the timer 87 is configured to measure the accumulated value (abnormal time period) of the state in which the difference calculated by the calculator 85 is equal to or greater than the threshold value (imbalance state).

Hereinafter, operation of the controller 8 (especially, the calculator 85, the determiner 86 and the timer 87) is described with reference to FIG. 8.

Figure 8:
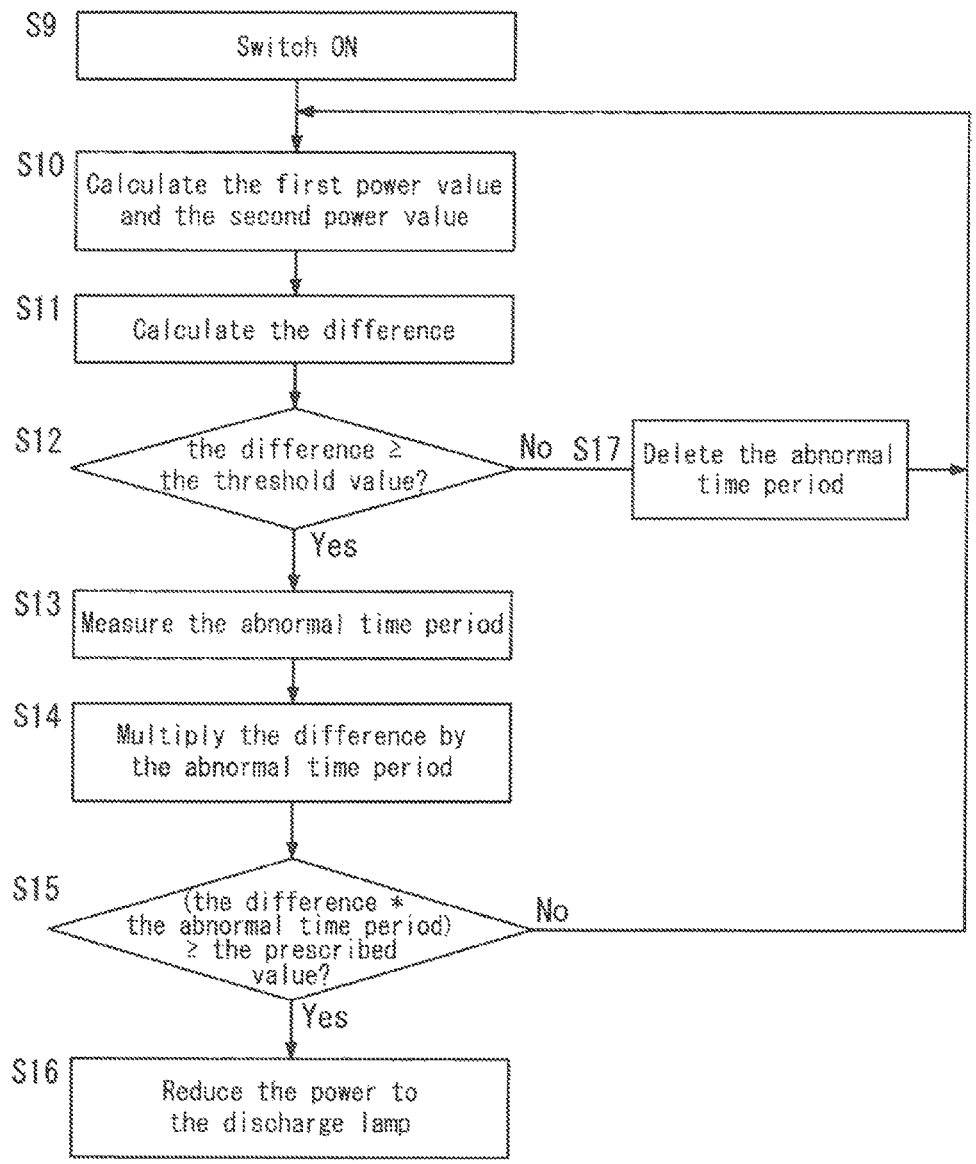
FIG. 8 is a flow chart of operation of a controller of the lighting device of Embodiment 2.

When the switch 300 is switched from the off state to the on state (S9 in FIG. 8), the calculator 85 calculates the first power value and the second power value (S10 in FIG. 8). Additionally, the calculator 85 calculates the difference between the first power value and the second power value (S11 in FIG. 8).

The determiner 86 determines whether the difference calculated by the calculator 85 is equal to or greater than the threshold value (S12 in FIG. 8).

When the determiner 86 determines that the difference is equal to or greater than the threshold value (S12 in FIG. 8: Yes), the timer 87 measures the abnormal time period (S13 in FIG. 8).

The calculator 85 calculates the product of the difference and the abnormal time period (S14 in FIG. 8).

The determiner 86 determines whether the product calculated by the calculator 85 is equal to or greater than the prescribed value (S15 in FIG. 8). When the product is determined to be equal to or greater than the prescribed value (S15 in FIG. 8: Yes), the determiner 86 determines that a ground fault has occurred.

When the determiner 86 determines that a ground fault has occurred, the controller 8 controls the DC power supply 3 and the inverter 4 to decrease the AC power Wa supplied to the discharge lamp 200 (S16 in FIG. 8).

When the determiner 86 determines that the product is smaller than the prescribed value (S15 in FIG. 8: No), the calculator 85 calculates the first power value and the second power value again (S10 in FIG. 8).

When the determiner 86 determines that the difference is smaller than the threshold value (812 in FIG. 8: No), the controller 8 deletes (resets) the abnormal time period measured by the timer 87 (S17 in FIG. 8).

Further, after deletion of the abnormal time period measured by the timer 87, the calculator 85 calculates the first power value and the second power value again (S10 in FIG. 8).

In the lighting device 110, operations of the calculator 85 and the determiner 86 are realized by one or more programs stored in the microcomputer serving as the controller 8, but may be realized by another configuration.

Note that, when the determiner 86 determines that a ground fault has occurred, the controller 8 controls the DC power supply 3 and the inverter 4 to decrease (reduce) the AC power Wa to the discharge lamp 200. In an alternative example, when the determiner 86 determines that a ground fault has occurred, the controller 8 controls the DC power supply 3 and the inverter 4 to stop (terminate) supply of the AC power Wa to the discharge lamp 200.

In a case where the prescribed value is 200 [Ws] and the difference is 20 [W], the determiner 86 of the lighting device 110 determines that a ground fault has occurred, when the abnormal time period becomes equal to 10 [s]. In another case where the prescribed value is 200 [Ws] and the difference is 25 [W], the determiner 86 of the lighting device 110 determines that a ground fault has occurred, when the abnormal time period becomes equal to 8 [s].

In contrast, in the lighting device 100 of Embodiment 1, for example, even if the difference is 25 [W], the determiner 83 does not determine that a ground fault has occurred, unless the abnormal time period is equal to or greater than 10 [s].

Therefore, the lighting device 110 can determine by the determiner 86 that a ground fault has occurred, earlier than the lighting device 100 of Embodiment 1. Accordingly, for example, when a ground fault current Is flows, the lighting device 110 can reduce the AC power Wa supplied to the discharge lamp 200 earlier than the lighting device 100 of Embodiment 1 does. As a result, compared with the lighting device 100 of Embodiment 1, it is possible to more successfully prevent malfunction of the lighting device 110. In short, in the present embodiment, it is considered that the controller 8 decides the predetermined time period in accordance with the difference between the first power value and the second power value, and determines that a ground fault has occurred when the imbalance state continues for the predetermined time period.

2.2 Modification 1

In the present modification, the determiner 86 has (stores) multiple prescribed values (candidates to be used as the prescribed value). The determiner 86 is configured to select one prescribed value from the multiple prescribed values so that the prescribed value becomes smaller as time elapses from the time at which the discharge lamp 200 is started by the igniter 5. In other words, the determiner 86 has (stores) multiple candidates for the prescribed value, and is configured to select the prescribed value from the multiple candidates so that the prescribed value decreases with an increase in time which elapses from start of the discharge lamp 200.

The determiner 86 has (stores) two prescribed values (a first prescribed value and a second prescribed value), for example. The second prescribed value is smaller than the first prescribed value.

For example, the determiner 86 selects the first prescribed value until the predetermined time elapses from the time point t2 at which the discharge lamp 200 is started by the igniter 5 (before the time point t4 in FIG. 6). For example, after a lapse the predetermined time (after the time point t4 in FIG. 6), the determiner 86 selects the second prescribed value.

In summary, the determiner 86 selects the first prescribed value throughout the start time period Tc and the change time period Td. Further, the determiner 86 selects the second prescribed value throughout the lighting time period Te.

Accordingly, it is possible to prevent the determiner 86 of the lighting device 110 from accidentally determining that a ground fault has occurred during the start time period Tc and the change time period Td, for example. Therefore, the lighting device 110 can detect a ground fault more and more successfully.

Note that, the determiner 86 has two prescribed values, but may have three or more prescribed values, for example.

2.3 Modification 2

In the present modification, the determiner 86 has (stores) multiple prescribed values (candidates to be used as the prescribed value). The determiner 86 is configured to select one prescribed value from the multiple prescribed values so that the prescribed value becomes larger as time elapses from the time at which the discharge lamp 200 is turned off. In other words, the determiner 86 has (stores) multiple candidates for the prescribed value, and is configured to select the prescribed value from the multiple candidates so that the prescribed value decreases with a decrease in time which elapses from turning-off of the discharge lamp 200.

The determiner 86 has (stores) two prescribed values (a third prescribed value and a fourth prescribed value), for example. The fourth prescribed value is smaller than the third prescribed value.

The determiner 86 selects the third prescribed value when time elapsing from turning-off of the discharge lamp 200 is relatively long. Further, the determiner 86 selects the fourth prescribed value when time elapsing from turning-off of the discharge lamp 200 is relatively short.

Accordingly, for example, it is possible to prevent the determiner 86 of the lighting device 110 from accidentally determining that a ground fault has occurred while the discharge lamp 200 has a low temperature. Therefore, the lighting device 110 can detect a ground fault more and more successfully.

Note that, the determiner 86 has two prescribed values, but may have three or more prescribed values, for example.

2.4 Conclusion

In the lighting device 110 described above, the controller 8 includes: the calculator 85 configured to calculate the difference based on the voltage value of the voltage measured by the voltage detector 6 and the current value of the current measured by the current detector 7; and the determiner 86 configured to determine whether a ground fault has occurred. The calculator 85 is configured to calculate the product of the difference and the period of the state in which the difference is equal to or greater than the threshold value (the abnormal time period). The determiner 86 is configured to determine that a ground fault has occurred when the product calculated by the calculator 85 is equal to or greater than the prescribed value.

Therefore, the lighting device 110 can determine by the determiner 86 that a ground fault has occurred, earlier than the lighting device 100 of Embodiment 1. Accordingly, for example, when a ground fault current Is flows, the lighting device 110 can reduce the AC power Wa supplied to the discharge lamp 200 earlier than the lighting device 100 of Embodiment 1 does. As a result, compared with the lighting device 100 of Embodiment 1, it is possible to reduce accumulation of excessive stress on multiple electronic parts constituting the lighting device 110 or the like.

Preferably, the determiner 86 includes multiple prescribed values. Preferably, the determiner 86 is configured to select one prescribed value from the multiple prescribed values in consideration of time which passes from a time at which the discharge lamp 200 is started by the igniter 5. Preferably, the multiple prescribed values are set so as to allow selecting a smaller one from the multiple prescribed values with an increase in time which passes from the time at which the discharge lamp 200 is started by the igniter 5.

Accordingly, it is possible to prevent the determiner 86 of the lighting device 110 from accidentally determining that a ground fault has occurred during the start time period Tc and the change time period Td, for example. Therefore, the lighting device 110 can detect a ground fault more and more successfully.

Preferably, the determiner 86 includes multiple prescribed values. Preferably, the determiner 86 is configured to select one prescribed value from the multiple prescribed values in consideration of time which passes from a time at which the discharge lamp 200 is turned off. Preferably, the multiple prescribed values are set so as to allow selecting a smaller one from the multiple prescribed values with a decrease in time which passes from the time at which the discharge lamp 200 is turned off.

Hence, it is possible to prevent the determiner 86 of the lighting device 110 from accidentally determining that a ground fault has occurred while the discharge lamp 200 has a low temperature. Therefore, the lighting device 110 can detect a ground fault more and more successfully.

Preferably, the controller 8 is to, when the determiner 86 determines that a ground fault has occurred, control the DC power supply 3 and the inverter 4 to reduce the AC power Wa supplied to the discharge lamp 200 or stop supply of the AC power Wa to the discharge lamp 200.

Accordingly, in the lighting device 110, it is possible to suppress excessive stress from being accumulated on multiple electronic parts constituting the lighting device 110 or the like. Therefore, a decrease in lifetime of the lighting device 110 can be suppressed.

3. Aspects According to the Present Disclosure

As apparent from the above embodiments, the lighting device (100; 110) of the first aspect in accordance with the present disclosure includes: a lighting circuit (10) configured to apply an AC voltage (Va) to a discharge lamp (200); a voltage detector (6) configured to measure a voltage value of the AC voltage (Va); a current detector (7) configured to measure a current value of AC current flowing through the discharge lamp (200); and a controller (8) configured to control the lighting circuit (10). The controller (8) is configured to calculate a first power value defined as a value of power supplied to the discharge lamp (200) in a first half period (Ta) of the AC voltage (Va) and a second power value defined as a value of power supplied to the discharge lamp (200) in a second half period (Tb) of the AC voltage (Va), based on the voltage value measured by the voltage detector (6) and the current value measured by the current detector (7). The controller (8) is configured to, when an imbalance state in which a difference between the first power value and the second power value is equal to or greater than a threshold value continues for a predetermined time period, determine that a ground fault has occurred.

In the lighting device (100; 110) of the second aspect in accordance with the present disclosure, realized in combination with the first aspect, the lighting circuit (10) includes: a DC power supply (3) configured to output a DC voltage; and an inverter (4) configured to convert the DC voltage into the AC voltage (Va) and apply the AC voltage (Va) to the discharge lamp (200).

In the lighting device (100; 110) of the third aspect in accordance with the present disclosure, realized in combination with the first or second aspect, the lighting circuit (10) includes an igniter (5) configured to apply a high voltage pulse to the discharge lamp (200) to start the discharge lamp (200).

In the lighting device (100; 110) of the fourth aspect in accordance with the present disclosure, realized in combination with any one of the first to third aspects, the controller (8) includes: a calculator (82) configured to calculate the difference based on the voltage value measured by the voltage detector (6) and the current value measured by the current detector (7); and a determiner (83) configured to, when the imbalance state continues for the predetermined time period, determine that a ground fault has occurred.

In the lighting device (100; 110) of the fifth aspect in accordance with the present disclosure, realized in combination with the fourth aspect, the determiner (83) stores multiple candidates for the threshold value, and is configured to select the threshold value from the multiple candidates so that the threshold value decreases with an increase in time which elapses from start of the discharge lamp (200).

In the lighting device (100) of the sixth aspect in accordance with the present disclosure, realized in combination with the fourth aspect, the determiner (83) stores multiple candidates for the threshold value, and is configured to select the threshold value from the multiple candidates so that the threshold value decreases with a decrease in time which elapses from turning-off of the discharge lamp (200).

In the lighting device (100) of the seventh aspect in accordance with the present disclosure, realized in combination with any one of the fourth to sixth aspects, the determiner (83) is configured to: select a first predetermined time period as the predetermined time period until predetermined time elapses from start of the discharge lamp (200); and select a second predetermined time period longer than the first predetermined time period as the predetermined time period after a lapse of the predetermined time from the start of the discharge lamp (200).

In the lighting device (110) of the eighth aspect in accordance with the present disclosure, realized in combination with any one of the first to third aspects, the controller (8) includes: a calculator (85) configured to calculate the difference based on the voltage value measured by the voltage detector (6) and the current value measured by the current detector (7) and calculate a product of the difference and a time period for which the imbalance state continues; and a determiner (86) configured to, when the product calculated by the calculator (85) is equal to or greater than a prescribed value, determine that a ground fault has occurred. In other words, the lighting device (110) includes: a lighting circuit (10) configured to apply an AC voltage (Va) to a discharge lamp (200); a voltage detector (6) configured to measure a voltage value of the AC voltage (Va); a current detector (7) configured to measure a current value of AC current flowing through the discharge lamp (200); and a controller (8) configured to control the lighting circuit (10). The controller (8) includes: a calculator (85) configured to calculate a first power value defined as a value of power supplied to the discharge lamp (200) in a first half period (Ta) of the AC voltage (Va) and a second power value defined as a value of power supplied to the discharge lamp (200) in a second half period (Tb) of the AC voltage (Va), based on the voltage value measured by the voltage detector (6) and the current value measured by the current detector (7), and calculate a product of the difference and a time period for which an imbalance state in which the difference is equal to or greater than a threshold value continues; and a determiner (86) configured to, when the product calculated by the calculator (85) is equal to or greater than a prescribed value, determine that a ground fault has occurred.

In the lighting device (110) of the ninth aspect in accordance with the present disclosure, realized in combination with the eighth aspect, the determiner (86) stores multiple candidates for the prescribed value, and is configured to select the prescribed value from the multiple candidates so that the prescribed value decreases with an increase in time which elapses from start of the discharge lamp (200).

In the lighting device (110) of the tenth aspect in accordance with the present disclosure, realized in combination with the eighth aspect, the determiner (86) stores multiple candidates for the prescribed value, and is configured to select the prescribed value from the multiple candidates so that the prescribed value decreases with a decrease in time which elapses from turning-off of the discharge lamp (200).

In the lighting device (100; 110) of the eleventh aspect in accordance with the present disclosure, realized in combination with any one of the first to tenth aspects, the controller (8) is configured to, when determining that a ground fault has occurred, control the lighting circuit (10) to reduce the AC voltage (Va) or stop supply of the AC voltage (Va) to the discharge lamp (200).

In the lighting device (100) of the twelfth aspect in accordance with the present disclosure, realized in combination with any one of the first to eleventh aspects, the controller (8) is configured to, when the difference becomes less than the threshold before the imbalance state continues for the predetermined time period, and then the difference becomes equal to or greater than the threshold, change the predetermined time period so that the predetermined time period decreases with a decrease in a time period in which the difference is kept less than the threshold.

The illuminating device (500) of the thirteenth aspect in accordance with the present disclosure includes: a discharge lamp (200); and the lighting device (100; 110) according to any one of the first to twelfth aspects for lighting the discharge lamp (200).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device, comprising:
    a lighting circuit configured to apply an AC voltage to a discharge lamp;
    a voltage detector configured to measure a voltage value of the AC voltage;
    a current detector configured to measure a current value of AC current flowing through the discharge lamp; and
    a controller configured to control the lighting circuit,
    the controller being configured to calculate a first power value defined as a value of power supplied to the discharge lamp in a first half period of the AC voltage and a second power value defined as a value of power supplied to the discharge lamp in a second half period of the AC voltage, based on the voltage value measured by the voltage detector and the current value measured by the current detector, and
    the controller being configured to, when an imbalance state in which a difference between the first power value and the second power value is equal to or greater than a threshold value continues for a predetermined time period, determine that a ground fault has occurred.

2. The lighting device according to claim 1, wherein the lighting circuit includes:
    a DC power supply configured to output a DC voltage; and
    an inverter configured to convert the DC voltage into the AC voltage and apply the AC voltage to the discharge lamp.

3. The lighting device according to claim 1, wherein
the lighting circuit includes an igniter configured to apply a high voltage pulse to the discharge lamp to start the discharge lamp.

4. The lighting device according to claim 1, wherein
the controller includes:
   a calculator configured to calculate the difference based on the voltage value measured by the voltage detector and the current value measured by the current detector; and
   a determiner configured to, when the imbalance state continues for the predetermined time period, determine that a ground fault has occurred.

5. The lighting device according to claim 4, wherein
the determiner stores multiple candidates for the threshold value, and is configured to select the threshold value from the multiple candidates so that the threshold value decreases with an increase in time which elapses from start of the discharge lamp.

6. The lighting device according to claim 4, wherein
the determiner stores multiple candidates for the threshold value, and is configured to select the threshold value from the multiple candidates so that the threshold value decreases with a decrease in time which elapses from turning-off of the discharge lamp.

7. The lighting device according to claim 4, wherein
the determiner is configured to:
   select a first predetermined time period as the predetermined time period until predetermined time elapses from start of the discharge lamp; and
   select a second predetermined time period longer than the first predetermined time period as the predetermined time period after a lapse of the predetermined time from the start of the discharge lamp.

8. The lighting device according to claim 1, wherein
the controller includes:
   a calculator configured to calculate the difference based on the voltage value measured by the voltage detector and the current value measured by the current detector and calculate a product of the difference and a time period for which the imbalance state continues; and
   a determiner configured to, when the product calculated by the calculator is equal to or greater than a prescribed value, determine that a ground fault has occurred.

9. The lighting device according to claim 8, wherein:
the determiner stores multiple candidates for the prescribed value, and is configured to select the prescribed value from the multiple candidates so that the prescribed value decreases with an increase in time which elapses from start of the discharge lamp.

10. The lighting device according to claim 8, wherein
the determiner stores multiple candidates for the prescribed value, and is configured to select the prescribed value from the multiple candidates so that the prescribed value decreases with a decrease in time which elapses from turning-off of the discharge lamp.

11. The lighting device according to claim 1, wherein
the controller is configured to, when determining that a ground fault has occurred, control the lighting circuit to reduce the AC voltage or stop supply of the AC voltage to the discharge lamp.

12. The lighting device according to claim 1, wherein
the controller is configured to, when the difference becomes less than the threshold before the imbalance state continues for the predetermined time period, and then the difference becomes equal to or greater than the threshold, change the predetermined time period so that the predetermined time period decreases with a decrease in a time period in which the difference is kept less than the threshold.

13. An illuminating device, comprising:
a discharge lamp; and
the lighting device according to claim 1 for lighting the discharge lamp.

* * * * *